(No Model.)
H. H. KOELLER.
HITCHING POST.
No. 341,488. Patented May 11, 1886.
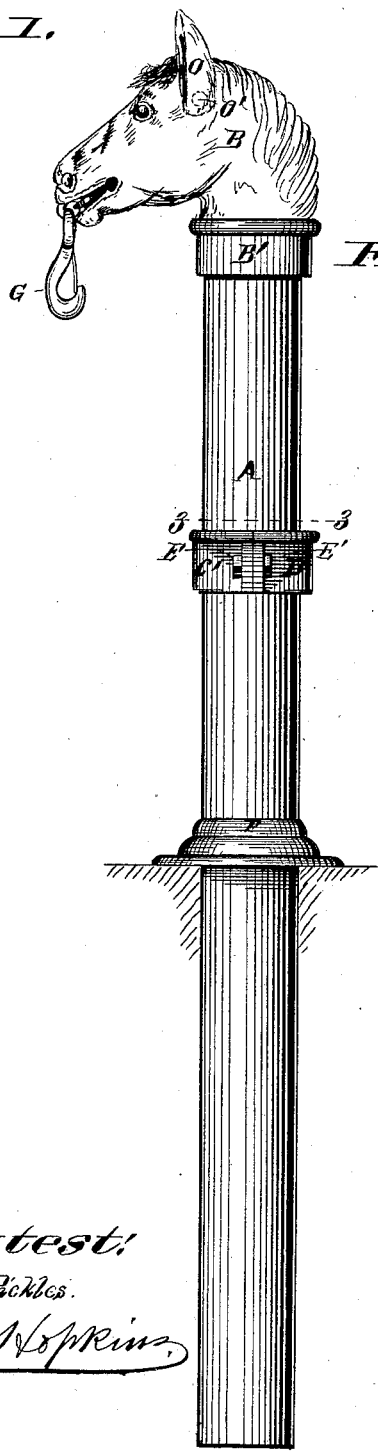
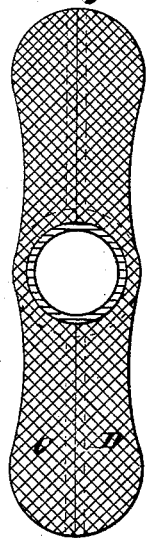
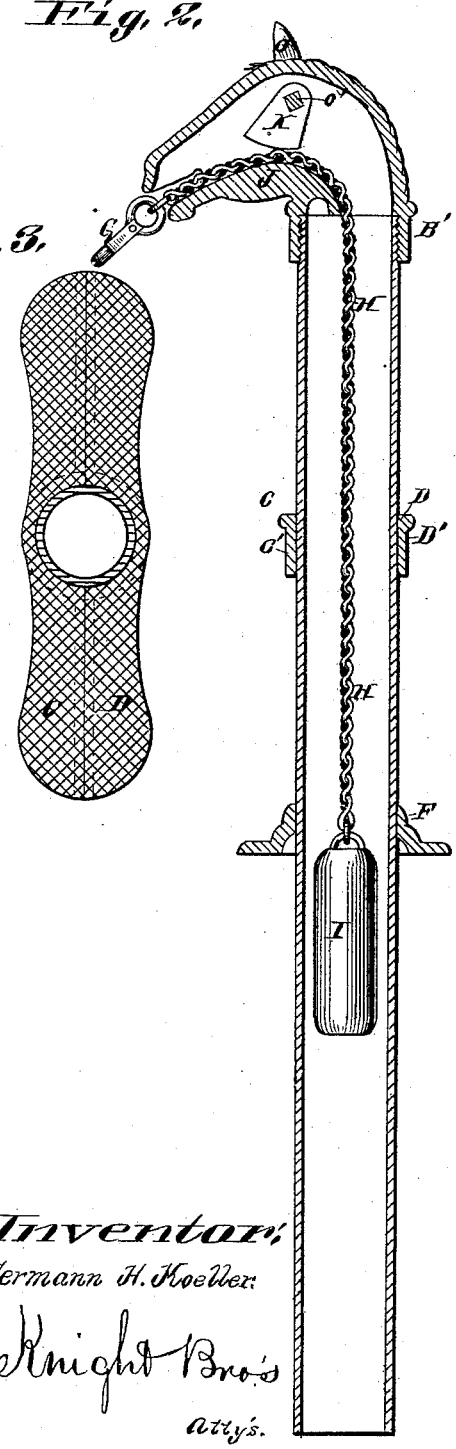
Attest:
C. Pickles.
A. Hopkins
Inventor:
Hermann H. Koeller.
By Knight Bro's
att'ys.

UNITED STATES PATENT OFFICE.

HERMANN H. KOELLER, OF ST. LOUIS, MISSOURI.

HITCHING-POST.

SPECIFICATION forming part of Letters Patent No. 341,488, dated May 11, 1886.

Application filed December 18, 1885. Serial No. 186,063. (No model.)

*To all whom it may concern:*

Be it known that I, HERMANN H. KOELLER, of the city of St. Louis, in the State of Missouri, have invented a certain new and useful Improvement in Hitching-Posts, of which the following is a full, clear, and exact description, reference being had to the accompanying drawings, forming part of this specification, and in which—

Figure 1 is a side elevation showing the post, mounting-step, and attachment to the hitching device. Fig. 2 is a vertical section showing the weighted hitch-chain, clamping devices, &c.; and Fig. 3 is a top view of the mounting-step, taken on line 3 3, Fig. 1.

Referring to the drawings, in which similar letters indicate like parts in the different figures, A represents one of my hollow metal hitching-posts, and B the figure of a horse's head that surmounts the post, being secured to it by a collar, B', that is cast as an integral part with the head. This collar is provided with an internal screw that engages with the screw-thread around the upper part of the post.

C and D represent the duplicate sections of a mounting-step, which are supplied with flanged bracket-collars C' and D', that are cast integral with said parts of the step. Threaded bolts E pass through coincident holes at the junction of the bracket-flanges, and, when secured with their nuts E', firmly attach the mounting-step to the post. A ground-plate, F, encircles the post at the ground-line, bracing its plant in the ground.

G represents the hitch-snap, which is attached by a chain, H, to a suspended weight, I. This weight keeps the chain withdrawn and housed within the post when not in use, and keeps the hitch-snap at the nose of the figure-head—the most convenient position for the rider to reach to and attach his horse before dismounting.

By forming the mounting-step in two parts cut away at their adjacent edges, for embracing the post, and securing them thereto by clamp-bolts, substantially as described, the movement of the weight I is unimpeded, and said weight may fall below or rise above the plane of said step, which would not be possible if the bolts which support the latter extended into the post. I am thus enabled to effectually combine a step and a hitching-post having a weighted hitching-chain.

The double step reaching both sides of the post offers a good facility for dismounting and remounting.

The chain, after entering the mouth of the figure-head, passes through a tubular orifice and down the hollow post to the weight that is suspended by it.

When the horse is hitched to a slack chain, (as a quiet horse can be,) the give and take of the weighted chain will enable the horse to stand at ease, which is an advantage, especially in fly-time, when a horse likes to shake his head and mane around and scare away the pests.

K represents a cam or pawl, which is secured to a shaft, O', passing through the head of the post, one end of said shaft, or each end, if desired, being secured to a lever, O, which is made to represent the horse's ear. The weight, it may be seen, always tends to draw the chain within the post; hence when the cam is moved out of engagement (in which position it may be held or counterbalanced by the weight of the ears O) the weight will take up the unnecessary slack, so that the horse can never get his feet over the hitch-chain, which has been the cause of many accidents.

By the use of this hitching device the use of cumbrous hitch-straps attached to the bridle or harness or carried in the vehicle can be dispensed with, and the normal position of the hitch-snap is always at the nose of the figure-head at a convenient height for hitching, which can be easily done by mounted travelers before dismounting.

I have described my hitch-post surmounted with the figure-head of a horse; but I may use any other suitable figure-head without departing from the essential features of my invention.

I claim as my invention—

1. The combination, with the hollow post A, having the head B and the hollow neck, of the hitching-chain H, passing through said neck, and having the weight I, depending within said post, a pawl, K, within the head, dogging said chain automatically against the action of the weight, and a shaft, O', to which said pawl is secured, projecting on the outside of the head, for engagement when it is desired to release the chain, as set forth.

2. The combination, with the hollow post A, having the head B and the hollow neck, of the hitching-chain H, passing through said neck, and having the weight I, depending within said post, the cam K within said head, and the ear O, forming at once an operating-lever and a counter-balance to hold said cam in or out of engagement, as set forth.

HERMANN H. KOELLER.

In presence of—
BENJN. A. KNIGHT,
SAML. KNIGHT.